(12) United States Patent
Oakley

(10) Patent No.: US 10,188,122 B2
(45) Date of Patent: Jan. 29, 2019

(54) CURD CUTTING METHOD

(71) Applicant: Dewayne Oakley, Richmond, CA (US)

(72) Inventor: Dewayne Oakley, Richmond, CA (US)

( * ) Notice: Subject to any disclaimer, the term of this patent is extended or adjusted under 35 U.S.C. 154(b) by 375 days.

(21) Appl. No.: 14/622,369

(22) Filed: Feb. 13, 2015

(65) Prior Publication Data
US 2015/0157035 A1    Jun. 11, 2015

Related U.S. Application Data

(63) Continuation of application No. 13/076,125, filed on Mar. 30, 2011, now abandoned.

(60) Provisional application No. 61/319,126, filed on Mar. 30, 2010.

(51) Int. Cl.
*A23C 19/06* (2006.01)
*A01J 25/06* (2006.01)

(52) U.S. Cl.
CPC ............. *A23C 19/06* (2013.01); *A01J 25/06* (2013.01); *Y10T 83/05* (2015.04)

(58) Field of Classification Search
CPC ........... A01J 25/06; A23C 19/06; Y10T 83/05
See application file for complete search history.

(56) References Cited

U.S. PATENT DOCUMENTS

| 3,836,688 A * | 9/1974 | Fischer et al. ......... A01J 25/06 426/36 |
| 6,780,445 B1 * | 8/2004 | Rhodes ............... A23C 19/053 426/317 |
| 2004/0168582 A1 * | 9/2004 | Sipma .................. A01J 25/06 99/452 |

* cited by examiner

*Primary Examiner* — Michele L Jacobson
*Assistant Examiner* — Preston Smith
(74) *Attorney, Agent, or Firm* — Fenwick & West LLP

(57) ABSTRACT

A method is disclosed for cutting cheese curd mass in a curd vat. A cutting apparatus is inserted into the vat before the curd mass is formed. A first cutting frame is used to cut the cheese curd in a first direction along one plane of the curd vat. The first cutting frame comprises one or more cutting wires extending in one or more directions. The method further comprises using a second cutting frame with one or more cutting wires extending in one or more directions. The second cutting frame operates in a second direction, wherein the second cutting operation removes the apparatus from the curd vat.

20 Claims, 5 Drawing Sheets

CURD CUTTING METHOD

CROSS REFERENCE TO RELATED APPLICATIONS

This application is a continuation of copending U.S. patent application Ser. No. 13/076,125, filed Mar. 30, 2011, which claims the benefit of U.S. Provisional Application No. 61/319,126 filed on Mar. 30, 2010, both of which are incorporated by reference in their entirety.

BACKGROUND

1. Field of Art

The disclosure generally relates to the field of cutting cheese curd.

2. Description of the Related Art

A curd cutting step in the cheese making process is commonplace. Since coagulated milk has a tendency to contract and expel water and whey, it is desirable to cut the coagulated milk curd into smaller pieces, increasing the surface area of the curd and allowing it to expel water and whey more effectively. One method of cutting cheese curd is to use a knife. Any food grade knife such as a bread knife, cake knife, etc. may be used to manually slice the curd in various different shapes. However, such a process of cutting cheese curd takes a long time. For example, a common method of cutting cheese curd with a knife requires a series of first cuts along the length of a vat or a container, a series of second cuts, perpendicular to the first cuts, a series of third cuts at another angle from the first cut and a series of fourth cuts around the edge of the vat to detach curd from the vat walls. Additionally, the resulting cheese curds may be of varying sizes based on human error in making uniform cuts. The resulting curds also may also be of a varying consistency, for example, applying too much downward pressure with a knife may cause the curd mass to be compressed and/or to tear resulting in pieces of varying consistency across the curd mass. Curds of varying sizes or consistency may result in cheese with undesirable texture, flavor or butter fat content.

Another method and apparatus for cutting cheese curd is to use wire knives comprising at least one cutting frame. The cutting frame has at least two opposite frame parts between which cutting wire sections extend in one or more directions. For example, a cutting frame may comprise wires extending longitudinally and transversely in a grid-like pattern. In a manual operation, such frames may be inserted into the cheese vat and operated along one direction, forming rectangular strips of cheese curd. To achieve smaller pieces of cheese curd, the cutting frame may be operated a second time in a different direction. Such a method and apparatus provides a more uniform cut of cheese curds when compared to using a knife. It is noted that such a wire frame cutting apparatus may be mechanically actuated by attaching the wire cutting frames on a mechanically drivable shaft.

Wire frame apparatuses cuts cheese curds faster and in a more uniform manner than using an unguided knife. However, there are several issues associated with using manually operated and mechanically mounted wire knives. For example, once the cutting frame is operated in a first direction, the cheese curds shift and rearrange to occupy the space created by the operation of the wire knife. Thus, when the cutting frame is operated in a second direction, it leads to an uneven cut, wherein the size of each resultant piece of the cheese curd is dependent on how much and where each cheese curd piece has shifted after the first cut. Additionally, such movement makes the task of the cheese maker much more difficult as more effort is required to pass the cheese cutting frame through the entire mass of cheese. Another problem with the operation of wire knives is that when the frame is first inserted in the cheese curd vat, it breaks the cheese curds because of additional pressure applied to insert the cutting frame. Thus, manually operated and mechanically mounted wire knives also results in cheese curds of varying, inconsistent sizes, causing uneven moisture and whey egress, ultimately resulting in cheese of undesirable consistency, flavor or butter fat content.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments in accordance with the disclosed method for purposes of illustration only. One skilled in the art will readily recognize from the following description that alternative embodiments may be employed without departing from the principles described herein.

Configuration Overview

The disclosure pertains to a method and corresponding apparatus for cutting cheese curds in a time and energy efficient manner, while ensuring that the resultant cheese curd pieces are of a uniform size and consistency. In one embodiment, the apparatus is used with a cylindrical cheese curd vat; it comprises a rotating frame that rotates along the cylinder's axis. The cutting frame comprises cutting wires that extend radially out from the center of the cylinder towards the walls of the cylinder. The apparatus further comprises a second cutting frame comprising of cutting wires extending in two dimensions forming a grid of wires along the bottom of the vat. In one operation of the apparatus, the rotating frame is rotated around the center axis of the cheese curd vat; once the cheese curd is cut along the rotational axis, the apparatus is removed by lifting it out of the curd vat. The lifting step cuts the curd rings into curd cubes by operating the grid-like wire knife frame across the curd mass.

Figure 4:
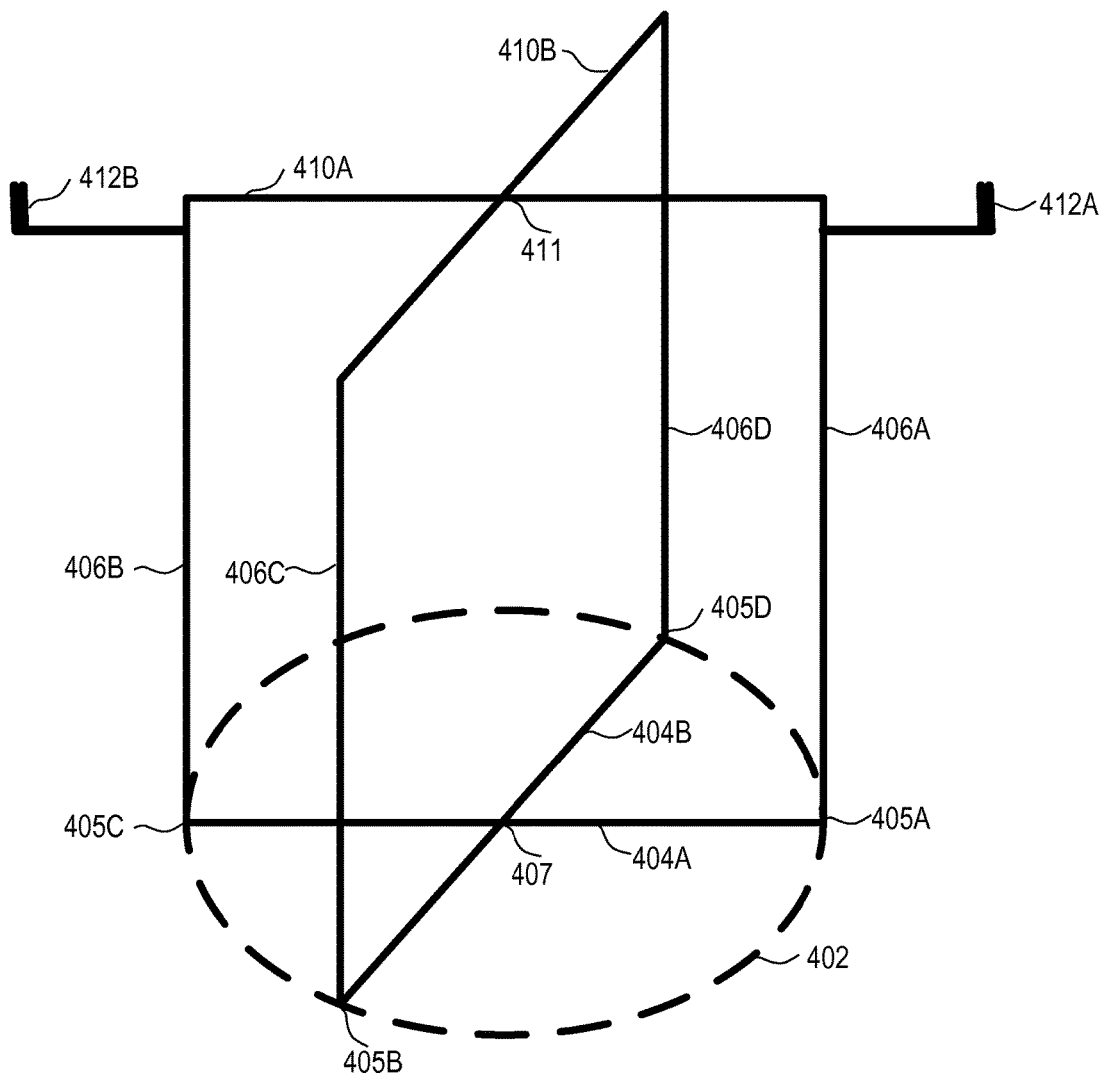
FIG. 4 illustrates one embodiment of a frame assembly of the apparatus of FIG. 1.

It is noted that for ease of discussion, in most instances FIG. 4 and the other figures use like reference numerals to identify like elements. A letter after a reference numeral, such as "402A," indicates that the text refers specifically to the element having that particular reference numeral. A reference numeral in the text without a following letter, such as "402," refers to any or all of the elements in the figures bearing that reference numeral (e.g. "402" in the text refers to reference numerals "402A" and/or "404B" in the figures).

Rotational Apparatus Configuration

Figure 1:
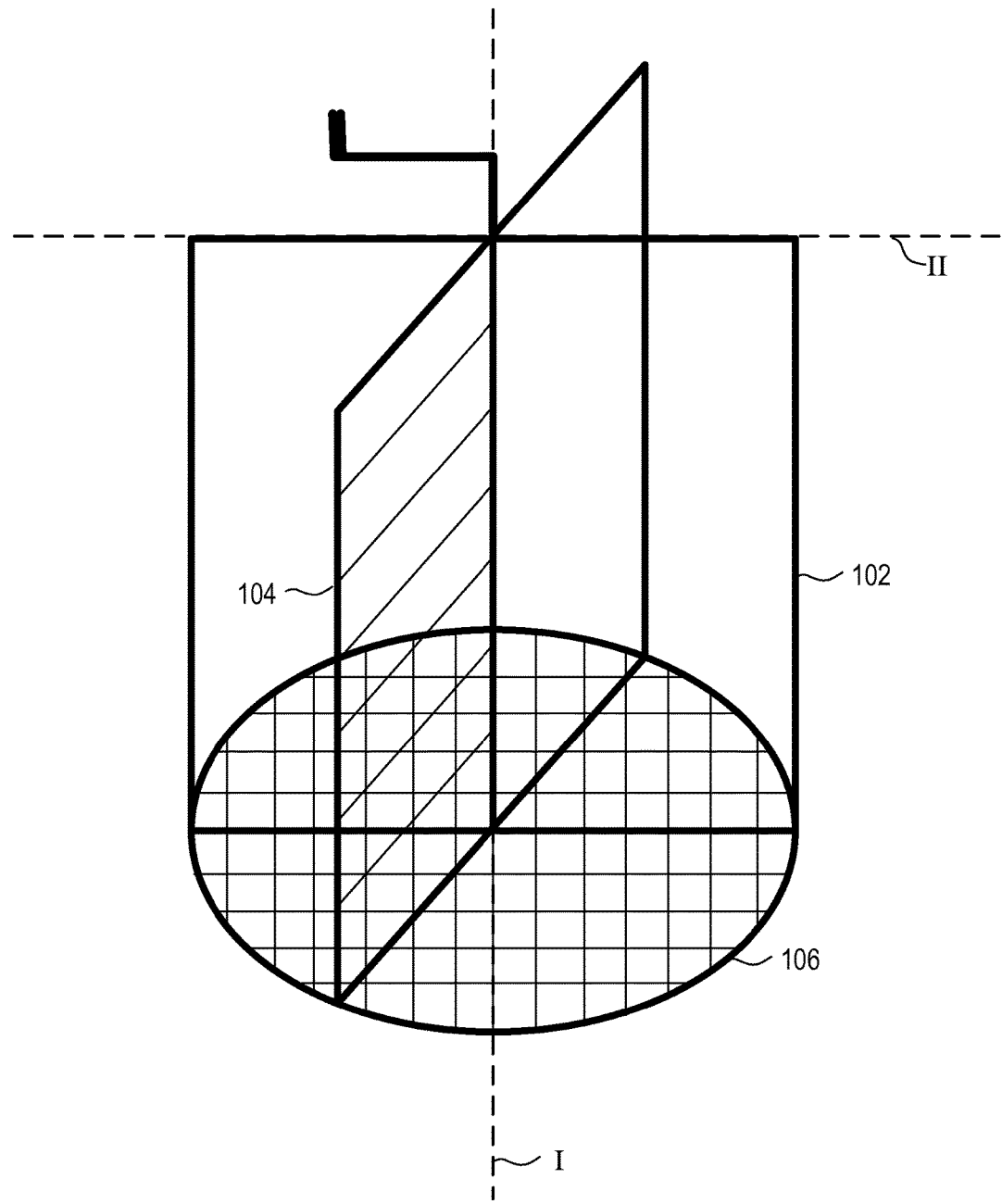
FIG. 1 illustrates an example apparatus to cut cheese curd mass within a cylindrical curd vat in accordance with one embodiment.
Figure 2:
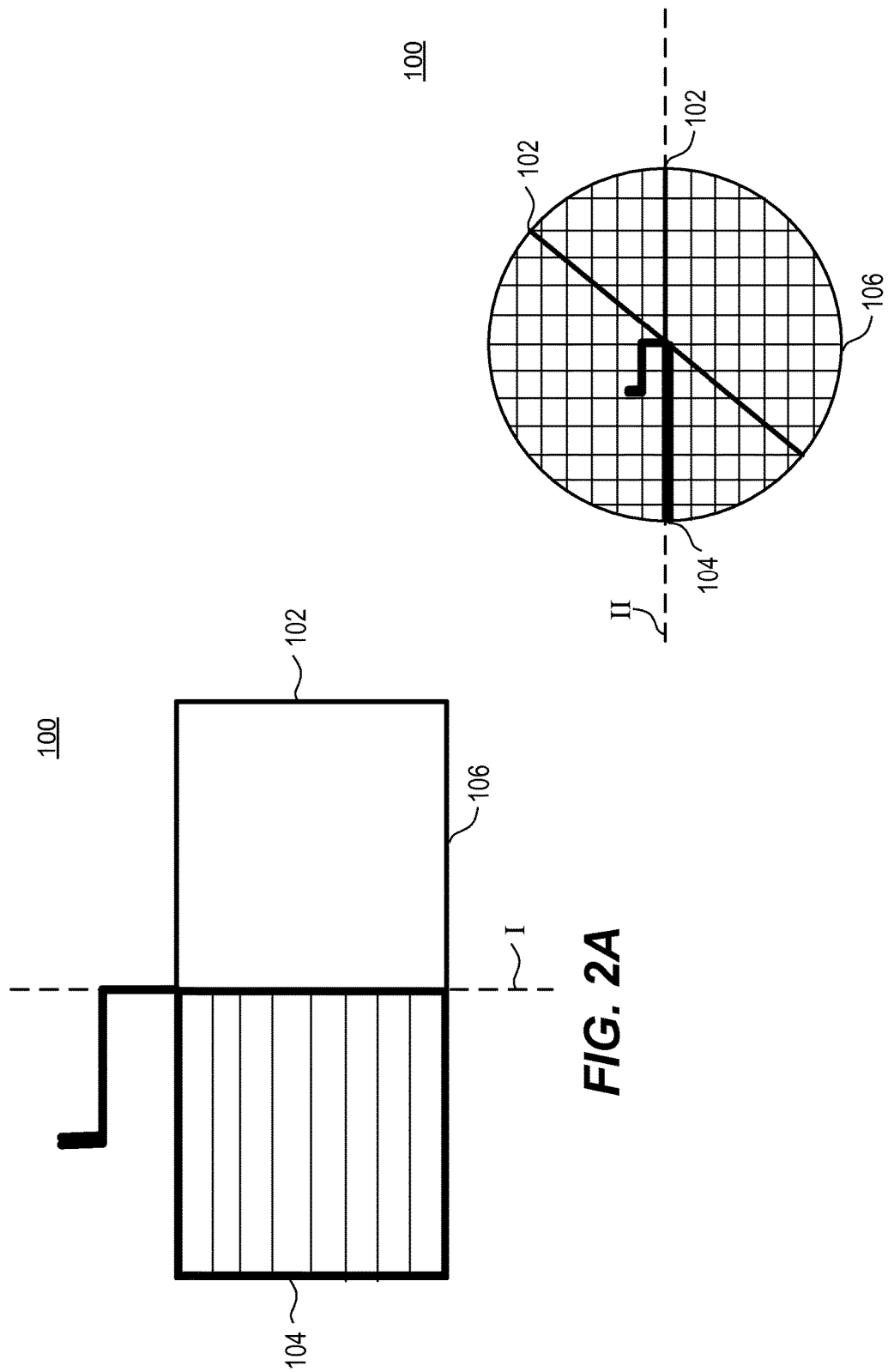
FIG. 2a shows the apparatus of FIG. 1 in an side view along line I in FIG. 1
FIG. 2b shows the apparatus of FIG. 1 in top plan view along line II in FIG. 1.

FIG. 1 illustrates one embodiment of the disclosed apparatus 100 to cut cheese curd mass in a uniform size having a uniform consistency. Apparatus 100 is an example of an embodiment used with a flat bottom, cylindrical cheese curd vat. Additionally, FIG. 2a shows the apparatus of FIG. 1 in a side view along line I in FIG. 1. FIG. 2b shows the apparatus of FIG. 1 in top plan view along line II in FIG. 1. The apparatus 100 includes a frame assembly 102, a rotating frame 104 and a grid-like cutting frame 106. The parts are configured to function and interoperate as described herein.

In this embodiment, wherein the cheese curd vat is a cylindrical, flat bottom container, the apparatus 100 includes a frame assembly 102 which couples with the rotating frame 104, and the grid-like cutting frame 106. In one such embodiment, the frame assembly 102 comprises a circular base of a diameter slightly smaller than the diameter of the cylindrical curd vat, wherein the frame assembly 102 can be placed inside the curd vat. An exemplary embodiment of the frame assembly 102 is shown in FIG. 4.

Referring now to FIG. 4, an embodiment of the frame assembly 102 comprises a circular base 402, one or more base frame members 404, one or more support members 406, one or more transverse frame members 410, and one or more handles 412. As disclosed above, the circular base 402 is of a diameter slightly smaller than the diameter of the cylindrical curd vat, wherein the circular base 402 fits inside the curd vat. In other embodiments, the circular base 402 is of varying shapes and sizes, depending on the size of the curd vat to be used. In another embodiment, the circular base 402 is not employed in the frame assembly 102. Another embodiment, where the base 402 is of a rectangular shape is disclosed further below in FIG. 2.

The frame assembly 102 further comprises one or more base frame members 404. In one embodiment, the base frame members 404A, and 404B intersect at a point at or near the center 407 of the circular base 402. The base frame members 404A and 404B further couple with the circular base 402 at different points 405. In one embodiment, the base frame members 404A and 404B are coupled to the circular base 402 by spot welding the parts together at the corresponding four points 405A, 405B, 405C and 405D. In other embodiments, the base frame members are coupled to the circular base using other mechanical attachments, such as screws, nails, nuts and bolts, etc. In practice, mechanisms for attaching the base frame members 404 to the circular base 402 that are smaller (e.g., spot welding) result in less tearing and mashing of curd than larger mechanisms such as bolts.

The frame assembly 102 further comprises one more support members 406. In one embodiment, the support frame members 406A, 406B, 406C and 406D extend in a perpendicular direction to the base frame members 404A and 404B. The support frame members 406 are coupled to the circular base 402, and the base frame members 404 at points 405 by using spot welding. As described in greater detail below, the support frame members 406 are additionally connected to the transverse frame members 410. In another embodiment, the support frame members 406 are connected to one or more additional support members to increase the structural integrity of the frame assembly 102. In other embodiments, any method well known in the art is used to attach or couple the support frame members 406 to the other parts of the frame assembly 102.

The frame assembly 102 also comprises one or more handles 412. The handles 412A and 412B are used to stabilize the frame assembly 102 and the apparatus 100 within the curd vat, such that the frame assembly 102 does not shift or rotate within the vat while operating the rotating frame 104. Additionally, the handles 412 enable the operator to lift the frame assembly 102 and the apparatus 100 out of the curd vat. In one embodiment the handles are attached the to the support members 406. In other embodiments the handles 412 are attached to the transverse members 410. In other embodiments, the members are attached to any part of the frame assembly, in a method well known in the art such as spot welding, screws, brackets, etc.

Figure 5:
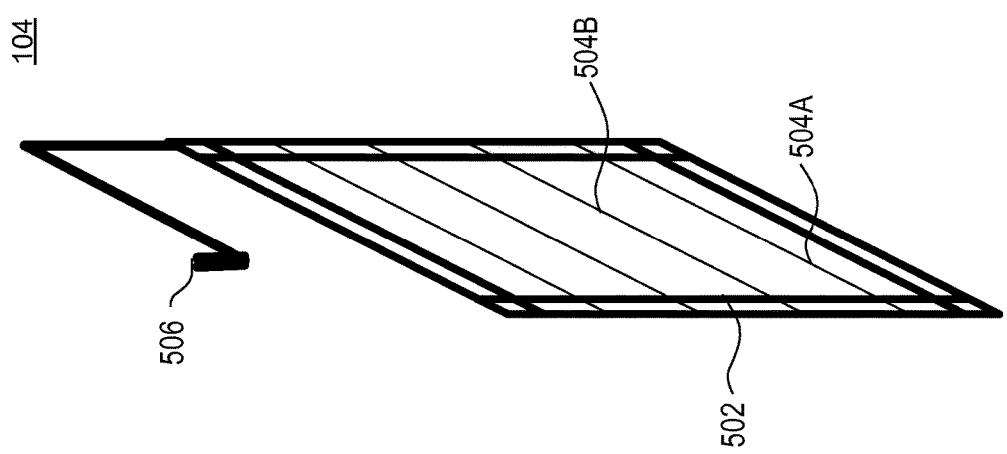
FIG. 5 illustrates one embodiment of a rotating frame of the apparatus of FIG. 1.

Referring now also to FIG. 5, the frame assembly 102 comprises one or more rotational brackets at one or more points 407, 411. The rotational brackets rotatably couple with the cutting frame 104 allowing the cutting frame 104 to spin within the frame assembly 102. In another embodiment, the frame assembly 102 is further coupled to a handle 506 at point 411 to help propel the rotational cutting frame 104 in a rotational motion. In another embodiment, an additional frame member extending from point 407 to point 411 is used to rotatably couple the cutting frame 104 with the frame assembly 102.

The frame assembly 102 further comprises of one or more transverse frame members 410. The transverse frame members provide additional structural support to the frame assembly 102 by attaching to and stabilizing the support frame members 406. The transverse frame members 410 are attached or coupled to the support frame members 406 by means well known in the art, including spot welding, screws, nuts and bolts, etc.

Referring again to FIG. 1, the disclosed apparatus 100 comprises one or more cutting frames 104. The cutting frame 104 operates by rotating around the center axis of the frame assembly 102. A majority of the curd mass is cut into rings with a rectangular cross-section as the knives within the cutting frame 104 cut the curd mass in the direction of operation. In an embodiment containing only one cutting frame 104, it is operated to complete one full rotation around the center axis to cut a substantial portion of cheese curd mass into rings. In another embodiment containing two cutting frames, the frames are actuated to complete a half rotation around the center axis to cut the entire cheese curd mass into rings. As shown above, it is noted that varying number and shapes of the cutting frame 104 may be employed in other embodiments. One embodiment of the cutting frame 104 is shown in greater detail in FIG. 5 as referenced below.

Turning again to FIG. 5, the cutting frame 104 comprises a rectangular frame 502, wire knives 504 and a handle 506. The rectangular frame 502 is formed by four connected strips of material, two extending horizontally and two extending vertically, having a height and width slightly smaller than the radius and the height of the frame assembly 102, respectively; wherein the frame can be operated in a rotational manner within the frame assembly 102. The wire knives 504 are a plurality of wires or knives secured at either end of the frame to form a plurality of small openings within the rectangular frame 502. In other embodiments, the size of the openings varies depending upon the size of the pieces desired for the cut curd. In another embodiment, the wires or knives 504 are turned at a particular angle within the cutting frame 502 to obtain a particularly shaped curd cut. The handle 506 is attached to the rectangular frame 502 to enable the rotational operation of the cutting frame 104 within the frame assembly 102. In another embodiment, a suitable power driven apparatus is attached to the handle 506 to drive the operation of the cutting frame 104. In yet another embodiment, a suitable power driven apparatus is used in place of the handle 506 to drive the operation of the cutting frame 104.

In one embodiment, the cutting frame 104 is secured to the frame assembly 102 with the use of brackets at points 411 and 407, such that the cutting frame 104 rotates or pivots along the central axis of the frame assembly 102. In another embodiment, the cutting frame 104 is secured to a rotational axis frame member wherein the frame member rotates within the frame assembly, allowing the cutting frame 104 to operate in a rotational direction within the frame assembly 102. In another embodiment, the rotating frame 104 is attached to the frame assembly 102 in a manner such that each can be detached and re-attached by a user. In other embodiments, the cutting frame 104 is rotatably coupled to the frame assembly 102 by other means known in the art.

Referring again to FIG. 1, the illustrated apparatus 100 includes a grid-like cutting frame 106. The grid-like cutting frame 106 operates by being operated in a vertical direction to cut the rings of cheese curd into cubes. The cutting frame 106 cuts the curd into cubes by cutting the rings of curd in two dimensions as represented by the grid of wire knives. In one embodiment, the grid-like cutting frame 106 is operated by lifting the entire apparatus out of curd vat in a vertical direction. In another embodiment, the frame 106 is operated by lifting only the grid-like cutting frame, vertically across the curd mass with the help of an attached member. One embodiment of the grid-like cutting frame 106 is illustrated in FIG. 6, as referenced below.

Figure 6:
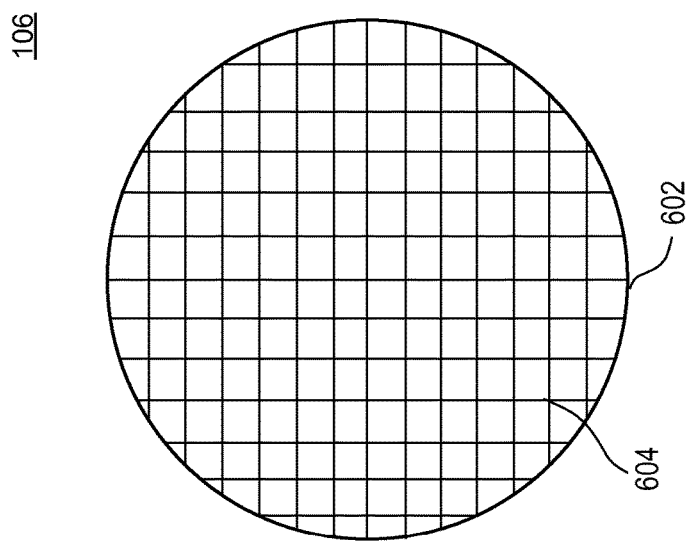
FIG. 6 illustrates one embodiment of a grid-like cutting frame of the apparatus of FIG. 1.

Turning now to FIG. 6, the illustrated embodiment of the grid-like cutting frame 106 comprises a circular frame 602 and wire knives 604. The circular frame 602 is formed by a circular strip of material of a diameter similar to that of the frame assembly 102. The wire knives 604 are a plurality of intersecting wires or knives secured at a point on the circular frame 602. The intersecting wires form a grid dividing the same within the circular frame 602 into a plurality of small openings, the size of which depend on the size of the pieces desired for the cut curd. The grid-like cutting frame 106 is attached to the frame assembly by one or more methods known in the art, such as spot welding, screws, or nuts and bolts. In another embodiment, the grid-like cutting frame 106 is attached to the frame assembly 102 in a manner such that each can be detached and re-attached by a user. In an alternate embodiment, cutting frame 106 has cutting wires in another configuration, such as radially disposed. The selection of cutting wire configurations may impact the nature of the curds produced, and those skilled in the art will select one configuration over another based on the nature and consistency of the curds that is desired.

Sliding Apparatus Configuration

Figure 3:
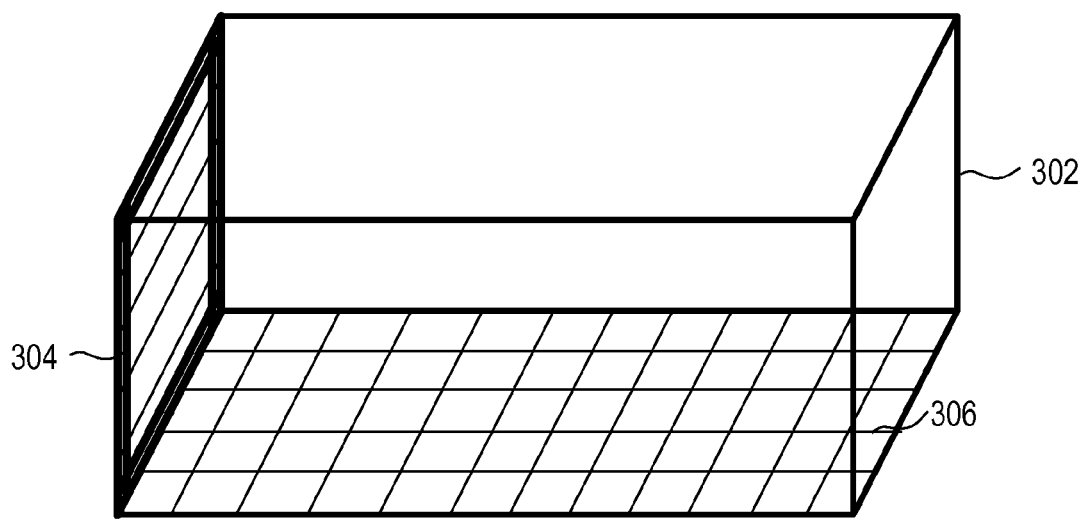
FIG. 3 illustrates an example apparatus to cut cheese curd mass within a rectangular curd vat in accordance with one embodiment.

FIG. 3 illustrates one embodiment of the disclosed apparatus for cutting a cheese curd mass in a flat bottom, rectangular curd vat. The apparatus 300 includes a frame assembly 302, a sliding frame 304, and a grid-like cutting frame 306.

In one embodiment of the frame assembly 302 comprises a three dimensional frame with height, width and length slightly smaller than the height, width and length, respectively of the curd vat, wherein the frame 302 can be placed in the vat. In one embodiment, the lengthwise frame members comprise guide tracks, wherein the sliding frame 304 is coupled to the guide tracks to operate and guide the frame 304 in a lengthwise direction. In other embodiments, the guide tracks are placed on one or more frame members in one or more directions to operate the sliding frame 304 in one or more directions.

The sliding frame 304 operates by cutting the curd mass in the direction of operation, thereby producing strips of cheese curd with a rectangular cross-section. In one embodiment, the sliding frame 304 is operated lengthwise. In other embodiments, the sliding frame 304 may be operated in other directions. In another embodiment, the sliding frame 304 is operated on a plane perpendicular to the curd vat's largest surface area. In another embodiment, the sliding frame 302 comprises a plurality of intersecting wires or knives secured at either end of the frame 302 to form a grid dividing the space within the frame 302 into a plurality of small openings, the size of which will depend upon the size of the pieces desired for the cut curd. The sliding frame 304 is coupled to the frame assembly 302 in the same manner and comprises the same components as described in the FIG. 1 and FIG. 5 discussion above.

The grid-like cutting frame 306 is used to cut the strips of cheese curd created by the sliding frame 304. The grid-like cutting frame 306 operates in a vertical direction, from the base of the curd vat to the opening of the vat. Unlike the grid-like cutting frame of FIG. 6, the frame used in this embodiment is of a rectangular shape, slightly smaller than in length and width than the length and width, respectively of the curd vat. In other respects the grid-like cutting frame 306 operates and is attached to the frame assembly 302 in the same manner as disclosed in FIG. 6 discussion above.

The disclosed embodiments beneficially allow for cutting cheese curd mass in uniform sized cubes, having a more uniform consistency and in a much shorter time than the methods or apparatuses known in the art. The one or more rotating or sliding frames disclosed herein cuts the entire cheese curd mass in a single rotation or a single pass across the curd mass. This is advantageous because several rotations or several passes result in shifting the curd mass in the curd vat, resulting in curd pieces that are not uniform in size. The apparatus is operated by placing it in the curd vat before the curd mass has formed, allowing the grid-like cutting frame to also be operated in a single pass. Since, the apparatus is only removed from the curd vat it saves time compared to an apparatus that must be inserted and then withdrawn. Additionally, the grid-like cutting frame operates from the bottom to the top of the curd vat, enabling the apparatus to cut the curd mass without applying additional pressure which would be required if a knife were to be first inserted, and then withdrawn. Therefore, the apparatus has another advantage in preventing the curd mass from breaking under pressure applied in an operation of the knife from the top of the curd vat to the bottom.

Additional Configuration Considerations

Throughout this specification, plural instances may implement components, operations, or structures described as a single instance. Although individual operations of one or more methods are illustrated and described as separate operations, one or more of the individual operations may be performed concurrently, and unless otherwise noted nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for an apparatus for cutting cheese curd in a vat comprising a frame assembly coupled to a first cutting frame operating in a first direction, and a second cutting frame operating in a second direction, wherein the second cutting operation removes the apparatus from the curd vat through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of cutting a cheese curd mass within a cylindrical vat, the method comprising:
    placing a cutting apparatus inside the vat before the cheese curd mass has begun to form;
    once the cheese curd mass has formed, horizontally rotating a first knife assembly of the cutting apparatus around a vertical axis, thereby cutting the cheese curd mass into a plurality of horizontal slices; and
    thereafter, vertically removing from the vat a second knife assembly of the cutting apparatus, the second knife assembly having knives along at least two distinct orientations of the cutting apparatus, thereby cutting the horizontal slices along said orientations.

2. The method of claim 1, wherein said rotating engages the first knife assembly with the cheese curd mass without compression of the cheese curd mass against the vat.

3. The method of claim 1, wherein said rotating engages the first knife assembly with the cheese curd mass without compression of the cheese curd mass against any portion of the cutting apparatus other than the first knife assembly.

4. The method of claim 1, wherein said vertically removing engages the second knife assembly with the cheese curd mass without compression of the cheese curd mass against the vat.

5. The method of claim 1, wherein said vertically removing engages the second knife assembly with the cheese curd mass based primarily on gravitational force owing to a weight of the cheese curd mass on the second knife assembly.

6. The method of claim 1, wherein said rotating is a half rotation of the first knife assembly.

7. The method of claim 1, wherein said rotating is a full rotation of the first knife assembly.

8. The method of claim 1, wherein said vertically removing comprises removing the cutting apparatus from the vat.

9. The method of claim 1, wherein said vertically removing comprises retaining a portion of the cutting apparatus in the vat.

10. The method of claim 9, further comprising separating, after said vertically removing, the second knife assembly from the portion of the cutting apparatus retained in the vat.

11. A method of cutting a cheese curd mass within a vat, the method comprising:
    placing a cutting apparatus inside the vat before the cheese curd mass has begun to form;
    once the cheese curd mass has formed, cutting, using a first knife of the cutting apparatus, the cheese curd mass into a plurality of horizontal slices;
    thereafter, removing the cutting apparatus from the vat, thereby cutting the horizontal slices, with a second knife of the cutting apparatus, along at least two distinct orientations in a single pass.

12. The method of claim 11, wherein the first knife comprises a rectangular-frame supporting at least one wire that cuts the cheese curd mass into the plurality of horizontal slices.

13. The method of claim 11, wherein the vat is cylindrical with a flat bottom surface and the second knife comprises a circular frame conforming to the bottom surface, the second frame supporting a plurality of wires that cuts the horizontal slices along the at least two distinct orientations in the single pass.

14. The method of claim 13, wherein the plurality of wires form a grid of wires.

15. The method of claim 11, wherein the vat is cuboidal and the second knife comprises a rectangular frame conforming to a length and the depth of the vat, the rectangular frame supporting a plurality of wires that cuts the horizontal slices along the at least two distinct orientations in the single pass.

16. The method of claim 15, wherein the plurality of wires form a grid of wires.

17. The method of claim 11, wherein cutting the cheese curd mass into a plurality of slices comprises rotating the first knife about an axis.

18. The method of claim 11, wherein cutting the cheese curd mass into a plurality of slices comprises moving the first knife along a horizontal surface of the vat.

19. A method of cutting a cheese curd mass within a cuboidal vat, the method comprising:
    placing a cutting apparatus inside the vat before the cheese curd mass has begun to form;
    once the cheese curd mass has formed, horizontally sliding a first knife of the cutting apparatus along one dimension of the vat, thereby cutting the cheese curd mass into a plurality of horizontal slices; and
    thereafter, vertically removing from the vat a second knife assembly of the cutting apparatus, the second knife assembly having knives along at least two distinct orientations of the cutting apparatus, thereby cutting the horizontal slices along said orientations.

20. The method of claim 19, wherein said vertically removing engages the second knife assembly with the cheese curd mass based primarily on gravitational force owing to a weight of the cheese curd mass on the second knife assembly.

* * * * *